United States Patent Office 3,535,399
Patented Oct. 20, 1970

3,535,399
REMOVAL OF CARBONYLS FROM POLYMERIZABLE MONOMERS
Donald C. Tabler, Bartlesville, Okla., assignor to Phillips Petroleum Company, a corporation of Delaware
No Drawing. Filed Nov. 7, 1968, Ser. No. 774,201
Int. Cl. C07c 7/00; C10g 19/00
U.S. Cl. 260—681.5          8 Claims

ABSTRACT OF THE DISCLOSURE

Carbonyl compounds are removed from a butadiene effluent by contacting the effluent with an aqueous reagent comprising sodium hydroxide and urea.

FIELD OF THE INVENTION

This invention relates to the removal of impurities from the effluent stream of a process of dehydrogenation of butenes. In another aspect, it relates to a method for decreasing the amount of carbonyl impurities associated with 1,3-butadiene by contacting 1,3-butadiene containing the impurities with an aqueous scrubbing solution which contains selected proportions of reagents. Throughout the specification and claims the term "carbonyls" refers to compounds containing a (>C=O) group which includes organic acids, aldehydes and ketones. Exemplary compounds are furans, furfural, acetaldehydes, acetic acid, methylacetate, and the like.

DESCRIPTION OF THE PRIOR ART

It is well known in the art of polymerizing 1,3-butadiene that excessive amounts of carbonyls associated with the 1,3-butadiene monomer feed functions as a polymerization catalyst poison. Accordingly, the art has devised various means of removing these carbonyl compounds from the monomer prior to subjecting the monomer to the polymerization catalyst under polymerization conditions. Normally, the removal of carbonyls is effected during the monomer purification step and results in increased catalyst life with regard to the polymerization catalyst. Recently, the preparation of 1,3-butadiene has been accomplished by the use of the so-called oxidative dehydrogenation process. This process involves the contact of butenes with a suitable oxidative dehydrogenation catalyst in the presence of air or other oxygen-containing gas (and optionally steam), thereby providing an increased conversion of the butenes to the desired 1,3-butadiene. Although this process has resulted in increased production in the amount of 1,3-butadiene produced with respect to the amount of butenes charged to the oxidative dehydrogenation catalytic reactor, it has also resulted in an increase in the amount of carbonyl impurities which are present within the dehydrogenation reactor effluent.

Systems have been developed to separate the 1,3-butadiene product from the effluent of the dehydrogenation reactor which results in removal of certain amounts of the carbonyl impurities. It is still advantageous to employ furfural to selectively extract the 1,3-butadiene from the butenes product as part of the separation and purification steps. Due to the use of furfural and the increase in the amount of carbonyls which are present in the effluent from the dehydrogenation reactor, it has become increasingly necessary to find means to remove from the 1,3-butadiene product stream the carbonyl impurities prior to subjecting the 1,3-butadiene to polymerization reactions. Some consumers who utilize the 1,3-butadiene as a polymerization monomer require that the carbonyl content of the 1,3-butadiene be less than 10 p.p.m.

OBJECTS OF THE INVENTION

It is an object of the invention to remove carbonyl contaminants from 1,3-butadiene.

Other objects and advantages of the invention will become apparent to those skilled in the art from a reading of the description of the preferred embodiments and the claims.

SUMMARY OF THE INVENTION

Accordingly, the instant invention is designed to effect the removal of the carbonyl contaminants from a stream containing substantial amounts of 1,3-butadiene prior to subjecting the monomer to polymerization conditions. The process involves contact of a stream which contains substantial amounts of 1,3-butadiene and which also contains carbonyl impurities in a suitable apparatus with an aqueous solution which contains sodium hydroxide and urea, thereby effecting a reduction in the carbonyls and rendering the 1,3-butadiene stream substantially free of carbonyl impurities.

DESCRIPTION OF THE PREFERRED EMBODIMENTS

The removal of the carbonyl impurities is accomplished by subjecting a stream containing substantial amounts of 1,3-butadiene (such as the effluent from the reactor in the oxidative dehydrogenation process of butene) to contact with an aqueous solution containing sodium hydroxide and urea. Preferably, the stream containing the 1,3-butadiene and carbonyl impurities is vaporized prior to contact with the liquid aqueous scrubbing solution. However, it is within the scope of the invention to effectuate the contact of the liquid aqueous scrubbing solution with the liquid butadiene stream in a suitable liquid-liquid contacting apparatus which is well known to those skilled in the art.

When the butadiene stream is vaporized the invention contemplates passing the vaporized stream to a suitable apparatus wherein it is brought into contact with an aqueous solution which contains sodium hydroxide and urea solution. Although it is not completely understood, it is believed that the contact of the carbonyls which are contained in the 1,3-butadiene with the aqueous sodium hydroxide and urea solution causes the acids which are present within the carbonyls to react with sodium hydroxide thereby causing entrainment of the acids within the aqueous solution. The aldehyde and ketone portion of the carbonyls is believed to complex with the urea to form an aldehyde-urea, or ketone-urea resin. The resin remains entrained in the aqueous solution thereby effecting essentially complete removal of the carbonyl contaminants from the 1,3-butadiene product.

Preferably, 1,3-butadiene stream is heated to its boiling temperature of about 25° F. under atmospheric pressure thereby causing it to vaporize. The vaporized 1,3-butadiene is then passed to a liquid-gas contacting column wherein the vaporized stream of 1,3-butadiene is introduced into the lower portion of a packed column and the aqueous scrubbing solution containing the sodium hydroxide and urea is introduced in the liquid phase to the upper portion of the column. As the vaporized butadiene rises through the column, it contacts the liquid which falls through the packing of the column thereby effecting sufficient surface area contact of the vaporized 1,3-butadiene stream and that of the aqueous reagent. The dimensions and height of the column which is employed are well known to those skilled in the art to effect sufficient surface area contact of the 1,3-butadiene with the aqueous reagent.

When employing either the liquid-liquid or vapor-liquid contact of the 1,3-butadiene stream and the reagent, the only critical requirement with regard to the dimensions of the contacting apparatus is that a sufficiently large contact area be provided for the association of the monomer stream and the aqueous scrubbing solution. Accordingly, the amount of 1,3-butadiene charged to the column may be regulated to provide maximum association of aqueous scrubbing solution and the 1,3-butadiene. Accordingly, the charge rate can be dictated by the analysis of the resulting 1,3-butadiene product. In other words, the purified 1,3-butadiene existing the upper portion of the column may be analyzed periodically or automatically to determine carbonyl content and the charge rate of the 1,3-butadiene flowing to the column may be adjusted accordingly. If it is found that the carbonyl concentration is too high, the charge rate can be slowed, thereby effecting an increase in the ability of the aqueous solution to absorb the carbonyl impurities. If the analysis of the 1,3-butadiene product stream shows that the carbonyl content is below a specified level, thereby indicating an incomplete utilization of the aqueous solution to remove the carbonyl impurities the throughput can be increased, thereby effecting a more efficient utilization of the aqueous scrubbing solution.

When using a vapor-liquid contact or liquid-liquid contact, the heating of the 1,3-butadiene stream and passage into the column may be effected at above atmospheric pressures if desired. Generally, the pressures which will be employed will be in the range of from 15 to 100 p.s.i.a. Preferably, the aqueous solution of NaOH and urea is heated to a temperature range of 25 to 135° F., depending upon the pressure within the contacting apparatus, prior to being introduced to the upper portion of the column. Of course, the aqueous solution should not be heated to such a temperature as to result in the vaporization of the solution. The aqueous solution containing the sodium hydroxide and urea components may be removed at the lower portion of the column in a liquid phase. It is preferred to maintain the sodium hydroxide and urea content of the aqueous solution at a minimum level in order to efficiently utilize the amounts of sodium hydroxide and urea present in the aqueous solution to scrub out the carbonyls. It is understood that when liquid-liquid contact of the butadiene containing carbonyls is utilized, the scrubbing solution and the butadiene stream can be heated to temperatures below the respective boiling points.

Accordingly, the aqueous solution of sodium hydroxide and urea advantageously contains from 5–20 weight percent sodium hydroxide and 5–15 weight percent urea. Preferably, the solution contains about 10–15 weight percent sodium hydroxide and at least about 10 percent urea. The solution is prepared simply by adding the measured amount of reagents to the water. It is within the scope of the invention to vary the proportion of urea and sodium hydroxide which is present in the solution. However, it is preferred that the sodium hydroxide be present in a sufficient amount to remove the acid components of the carbonyls and that the urea be in a sufficient amount to remove the aldehyde and ketone portions of the carbonyls. It is also within the scope of the invention to adjust the various concentrations of each component to effectively remove the carbonyls which are contained in the 1,3-butadiene stream with respect to the ability of the column to effect a sufficient contact between the carbonyls and the components of the aqueous scrubbing solution.

It is preferred that the introduction of the aqueous solution to the column at the upper portion thereof be of a constant value for the ease of operation and maintenance of the column. Accordingly, excellent results have been obtained when the proportion of sodium hydroxide is about 15 weight percent and the preferred amount of urea is about 10 weight percent in the aqueous solution. The amount of 1,3-butadiene which is passed to the column can thereby be regulated in response to the analysis of the 1,3-butadiene exiting the column, the analysis indicating carbonyl concentration. The results of the invention are graphically illustrated in the following examples which are presented to show the effectiveness of the sodium hydroxide-urea solution in removing carbonyl contaminants from a stream of 1,3-butadiene.

Example I

A 1,3-butadiene sample containing 895 p.p.m. carbonyls was countercurrently contacted with the reagent in a 2-inch diameter by 2-foot long glass column packed with ¼" burl saddles. The reagent solution was circulated downward through the column by means of a centrifugal pump at a rate of 275 ml./min. The 1,3-butadiene vapor was scrubbed countercurrently with the reagent, exited the upper portion of the column, and sampled by condensing into a sample bulb and analyzed by UV analysis. The analysis of the samples is shown below in Table I.

TABLE I

| Aqueous reagent | Gas velocity, ft./min. | Carbonyl concentration, p.p.m.[1] |
|---|---|---|
| 15% NaOH+10% urea | 1 | 2.5 |
| 15% NaOH+10% urea | 2 | 11.7 |

[1] Parts per million.

The above results clearly indicate the effectiveness of reducing carbonyl concentration in a vaporized 1,3-butadiene stream by contacting the butadiene stream with an aqueous solution of sodium hydroxide and urea.

Example II

The same procedure was followed as in Example I with the exception that the 1,3-butadiene contained 387 p.p.m. carbonyl concentration and the aqueous reagent utilized was a solution of 5 percent sodium hydroxide. The vaporized 1,3-butadiene was fed to the column at a gas linear velocity of one foot per minute. Analysis of the sample by UV absorption showed that the carbonyl concentration utilizing sodium hydroxide alone as contacting reagent was 52.5 p.p.m.

Accordingly, the invention as disclosed herein contemplates the removal of carbonyl impurities (acids, aldehydes, and ketones) from a dehydrogenation effluent, which results from the dehydrogenation of butenes to provide 1,3-butadiene, by contacting the 1,3-butadiene stream with an aqueous solution containing about 5–20 weight percent sodium hydroxide and about 8 to 15 weight percent urea. The contact of the 1,3-butadiene and the aqueous scrubbing solution results in a decrease in concentration in the carbonyls thereby rendering the 1,3-butadiene monomer suitable for polymerization purposes.

Reasonable variations and modification are possible without departing from the spirit and scope of the invention.

I claim:
1. A method of reducing the concentration of carbonyls in a stream comprising 1,3-butadiene, said method comprising contacting the 1,3-butadiene stream with an aqueous solution comprising about 5–20 weight percent sodium hydroxide and about 8–12 weight percent urea.

2. A method according to claim 1 wherein the 1,3-butadiene stream is vaporized prior to contact with the aqueous solution.

3. A method according to claim 2 wherein the contact of said aqueous solution and the vaporized stream comprising 1,3-butadiene is accomplished in a packed liquid-gas column by introducing the vaporized stream into the lower portion of the column and introducing the aqueous solution in the liquid phase into the upper portion of the column, thereby effecting contact by the sodium hydroxide and urea within the aqueous solution with the carbonyls present in the vaporized stream comprising 1,3-butadiene.

4. A method accoridng to claim 1 wherein the stream comprising 1,3-butadiene is brought into contact with the aqueous solution in a liquid-liquid column by introducing the 1,3-butadiene stream into the lower portion of the column and introducing the aqueous solution in the liquid phase into the upper portion of the column.

5. A method according to claim 1 wherein the 1,3-butadiene stream contains less than 1000 parts per million concentration of carbonyls.

6. A method according to claim 5 wherein the aqueous solution comprises about 10–18 weight percent sodium hydroxide and about 10 weight percent urea.

7. A method according to claim 5 wherein the aqueous solution comprises about 15 weight percent sodium hydroxide and about 10 weight percent urea.

8. A method according to claim 1 wherein the concentration of carbonyls in the separated 1,3-butadiene is less than 10 parts per million.

References Cited

UNITED STATES PATENTS

| | | | |
|---|---|---|---|
| 3,281,489 | 10/1966 | Goering | 260—681.5 |
| 3,336,414 | 8/1967 | Woerner | 260—681.5 |

DELBERT E. GANTZ, Primary Examiner

G. E. SCHMITKONS, Assistant Examiner

U.S. Cl. X.R.

208—48, 255, 283, 286